(12) United States Patent
Oliver et al.

(10) Patent No.: US 10,212,551 B2
(45) Date of Patent: Feb. 19, 2019

(54) LOCATION-BASED BUFFER MANAGEMENT SYSTEMS AND METHODS

(71) Applicant: Verizon Patent and Licensing Inc., Arlington, VA (US)

(72) Inventors: Michael R. Oliver, Hoboken, NJ (US); Siddharth Chitnis, Irving, TX (US); Akshaya Trivedi, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 41 days.

(21) Appl. No.: 14/796,149

(22) Filed: Jul. 10, 2015

(65) Prior Publication Data

US 2017/0013406 A1     Jan. 12, 2017

(51) Int. Cl.
| | |
|---|---|
| *H04W 4/02* | (2018.01) |
| *H04L 29/06* | (2006.01) |
| *H04L 29/08* | (2006.01) |
| *H04W 4/029* | (2018.01) |
| *H04L 12/835* | (2013.01) |

(52) U.S. Cl.
CPC ......... *H04W 4/025* (2013.01); *H04L 65/4084* (2013.01); *H04L 65/608* (2013.01); *H04L 65/80* (2013.01); *H04L 67/02* (2013.01); *H04L 67/18* (2013.01); *H04W 4/029* (2018.02); *H04L 47/30* (2013.01)

(58) Field of Classification Search
CPC .. H04W 4/025; H04W 4/029; H04L 65/4084; H04L 65/608; H04L 65/80; H04L 67/02; H04L 67/18
See application file for complete search history.

(56) References Cited

U.S. PATENT DOCUMENTS

| | | | | |
|---|---|---|---|---|
| 7,333,451 | B1* | 2/2008 | Khalil | H04L 29/06 370/331 |
| 9,779,362 | B1* | 10/2017 | Gold | G06N 99/005 |
| 2002/0087758 | A1* | 7/2002 | Dixon | G06F 3/0613 710/56 |
| 2012/0064908 | A1* | 3/2012 | Fox | H04W 28/10 455/452.2 |
| 2013/0227122 | A1* | 8/2013 | Gao | H04L 65/1083 709/224 |

* cited by examiner

*Primary Examiner* — David Orange

(57) ABSTRACT

An exemplary method includes a buffer management system tracking a geographic location of a mobile computing device while the mobile computing device receives streaming content by way of a network; determining, based on the tracked geographic location, that the mobile computing device is approaching a geographic area designated as having a network connectivity level that is below a predetermined threshold; and dynamically increasing, in response to determining that the mobile computing device is approaching the geographic area and based on the tracked geographic location of the mobile computing device, a size of a buffer maintained by the mobile computing device and used to present the streaming content by way of the mobile computing device. Corresponding systems and methods are also described.

16 Claims, 12 Drawing Sheets

LOCATION-BASED BUFFER MANAGEMENT SYSTEMS AND METHODS

BACKGROUND INFORMATION

Mobile computing devices (e.g., smartphones, tablet computers, etc.) are often used by users to stream content by way of a wireless network (e.g., a mobile phone network) while the users travel. For example, a user may utilize a mobile computing device to stream content while commuting to/from a workplace. During the commute, the user may pass through certain geographic areas (referred to herein as "dead zones") within which there is either limited or no network connectivity. Such dead zones may undesirably affect (e.g., prevent or delay) delivery of streaming content to the mobile computing device over the network. This, in turn, may at least temporarily disrupt (e.g., by pausing, interrupting, or degrading) a presentation of the streaming content by way of the mobile computing device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
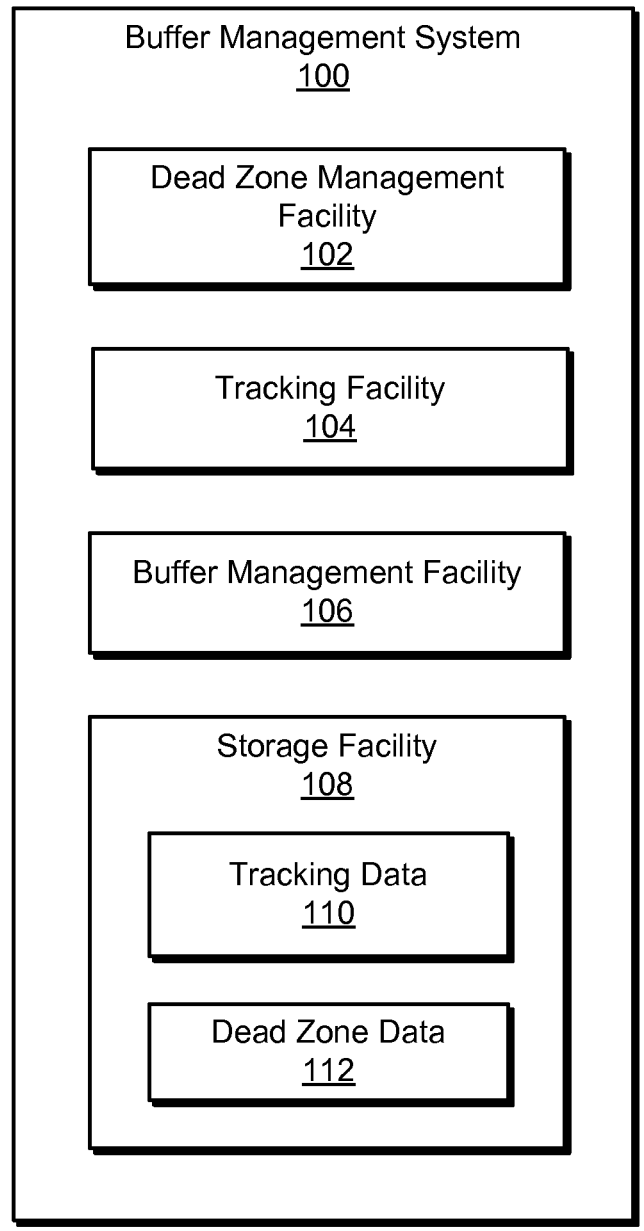
FIG. 1 illustrates an exemplary buffer management system according to principles described herein.

Exemplary location-based buffer management systems and methods are disclosed herein. For example, a buffer management system may track a geographic location of a mobile computing device while the mobile computing device receives streaming content by way of a network. Based on the tracked geographic location, the buffer management system may determine that the mobile computing device is approaching a geographic area designated as having a network connectivity level that is below a predetermined threshold. In response to the determining that the mobile computing device is approaching the geographic area and based on the tracked geographic location of the mobile computing device, the buffer management system may dynamically increase a size of a buffer maintained by the mobile computing device and used to present the streaming content by way of the mobile computing device.

The systems and methods described herein may also facilitate generating a network connectivity map that may be used to determine when and/or where to dynamically adjust a size of a buffer maintained by a mobile computing device. For example, a user may transport a mobile computing device while the mobile computing device receives streaming content by way of a network (e.g., by receiving a podcast while the user commutes to/from work). While the user transports the mobile computing device, the mobile computing device may enter one or more geographic areas where there is either limited network connectivity or no network connectivity (i.e., one or more dead zones). Entering the one or more geographic areas may result in an interruption of receipt of the streaming content and/or may require the mobile computing device to re-buffer the streaming content. In either case, the one or more geographic areas may cause an interruption in a presentation of the streaming content by way of the mobile computing device to the user.

To facilitate reduction of such interruptions, the buffer management system may monitor one or more network connectivity factors associated with a geographic area (e.g., when and where a dead zone may occur) included within a geographic zone. Based on the one or more network connectivity factors, the buffer management system may generate a network connectivity map that identifies the geographic area as having a network connectivity level that is below a predetermined threshold. After the buffer management system generates the network connectivity map, the buffer management system may track geographic locations of one or more mobile computing devices while the one or more mobile computing devices receive streaming content by way of the network and while the one or more computing devices move within the geographic zone. When it is determined that a mobile computing device included in the one or more mobile computing devices is approaching a geographic area identified in the network connectivity map, the buffer management system may dynamically adjust a size of a buffer maintained by the mobile computing device and used to present the streaming content by way of the mobile computing device. The buffer management system may also fill the buffer to ensure that the mobile computing device passes through the geographic area without the presentation of the streaming content being interrupted. Various ways in which the buffer management system may generate a network connectivity map and utilize the network connectivity map to dynamically adjust a size of a buffer will be described herein.

As used herein, a "mobile computing device" may include any suitable device that may be configured to receive streaming content by way of a network. For example, a mobile computing device may include, but is not limited to, a mobile phone, a smartphone, a tablet computer, a laptop computer, and/or any other mobile computing device as may serve a particular implementation. In certain examples, a mobile computing device may be incorporated as part of a vehicle (e.g., an in-dash vehicular computing device).

As used herein, "streaming content" may refer to any content and/or data that may be streamed to a mobile computing device by way of a network. For example, streaming content may refer to any television program, on-demand media program, pay-per-view media program, broadcast media program (e.g., broadcast television program), multicast media program (e.g., multicast television program), narrowcast media program (e.g., narrowcast video-on-demand program), Internet Protocol television ("IPTV") media program, advertisement, video, movie, audio program, radio program, video game, or any other media program that may be streamed to a mobile computing device by way of the network.

Various benefits may be realized in accordance with the systems and methods described herein. For example, by dynamically adjusting a size of a buffer of a mobile computing device on-the-fly as the mobile computing device approaches a dead zone, the systems and methods described herein may mitigate interruptions that may occur during a presentation of streaming content to a user of the mobile computing device. In addition, the systems and methods described herein may facilitate efficient consumption of network resources by the mobile computing device (e.g., by automatically reducing the buffer size when the mobile computing device leaves a dead zone). These and/or additional or alternative benefits that may be provided by exemplary systems and methods described herein will be made apparent by the following description. Exemplary location-based buffer management systems and methods will now be described with reference to the accompanying drawings.

FIG. 1 illustrates an exemplary location-based buffer management system 100 (or simply "system 100"). As shown, system 100 may include, without limitation, a dead zone management facility 102, a tracking facility 104, a buffer management facility 106, and a storage facility 108 selectively and communicatively coupled one to another. Facilities 102 through 108 may be coupled to one another by any suitable communication technologies.

It will be recognized that although facilities 102 through 108 are shown to be separate facilities in FIG. 1, any of those facilities may be combined into a single facility or split into additional facilities as may serve a particular implementation. Additionally or alternatively, one or more of the facilities 102 through 108 may be omitted from and external to system 100 in other implementations. Facilities 102 through 108 will now be described in more detail.

Storage facility 108 may be configured to store tracking data 110 representative of any data that may be associated with a geographic location, a speed, and/or a direction of travel of a mobile computing device within a geographic zone, and dead zone data 112 representative of any data associated with or that defines one or more dead zones. Storage facility 108 may maintain additional or alternative data as may serve a particular implementation.

Dead zone management facility 102 may be configured to identify and designate a geographic area included within a geographic zone as a dead zone. As used herein, a "dead zone" may refer to any geographic area and/or location that has a network connectivity level that is below a predetermined threshold. Dead zone management facility 102 may designate a geographic area as a dead zone in any suitable manner. For example, dead zone management facility 102 may track and/or monitor one or more network connectivity factors associated with a mobile computing device as the mobile computing device moves within the geographic zone while receiving streaming content by way of a network (e.g., a mobile network). Dead zone management facility 102 may use the mobile computing device in any suitable manner to monitor the one or more network connectivity factors.

As used herein, a "network connectivity factor" may refer to any factor that affects a quality of a connection between a mobile computing device and a network while the mobile computing device receives (or attempts to receive) streaming content. For example, a network connectivity factor may include, but is not limited to, a time of connectivity when the mobile computing device receives or attempts to receive the streaming content by way of the network, a signal strength level of the network when the mobile computing device receives or attempts to receive the streaming content by way of the network, a geographic location at which the mobile computing device receives or attempts to receive the streaming content by way of the network, a re-buffering rate that occurs as the mobile computing device receives or attempts to receive the streaming content by way of the network, and/or a duration of connectivity of the mobile computing device to the network. The time of connectivity may be representative of, for example, a particular time of day that the mobile computing device receives the streaming content. The signal strength level may be representative of, for example, a strength of the connection between the mobile computing device and the network, a bandwidth of the connection between the mobile computing device and the network, a speed at which data is transferred between the mobile computing device and the network, and/or any other indicator representative of a quality of the connection between the mobile computing device and the network. The re-buffering rate may indicate how often a presentation of streaming content is interrupted within a geographic area to re-buffer the streaming content. The duration of connectivity may correspond to how long the mobile computing device is connected to the network. It is understood that dead zone management facility 102 may monitor other network connectivity factors in other implementations.

As used herein, a "network connectivity level" may refer to a measured quality of a network connection that is available at a particular geographic location for a particular network. A network connectivity level may be defined in any suitable manner. For example, a network connectivity level may be defined by any one or a combination of network connectivity factors monitored at a particular geographic location.

As used herein, a "predetermined threshold" may correspond to a minimum network connectivity level at which a mobile computing device may present the streaming content to a user without interruption (e.g., without pausing and/or re-buffering). The predetermined threshold may be specified in any suitable manner and may be defined by any one or a combination of network connectivity factors. For example, a re-buffering rate that is above a certain level may by itself result in a network connectivity level at a particular geographic location falling below the predetermined threshold. Additionally or alternatively, an amount of bandwidth below a certain level and a signal strength level below a certain level may in combination result in a network connectivity level at a particular geographic location falling below the predetermined threshold. Other network connectivity factors or combinations of network connectivity factors may be used in other implementations to specify the predetermined threshold.

Dead zone management facility 102 may monitor the one or more network connectivity factors in any suitable manner. For example, while a mobile computing device receives streaming content by way of the network, dead zone management facility 102 may access, in any suitable manner, data associated with the one or more network connectivity factors at different geographic locations and record the data as dead zone data 112.

Figure 2:
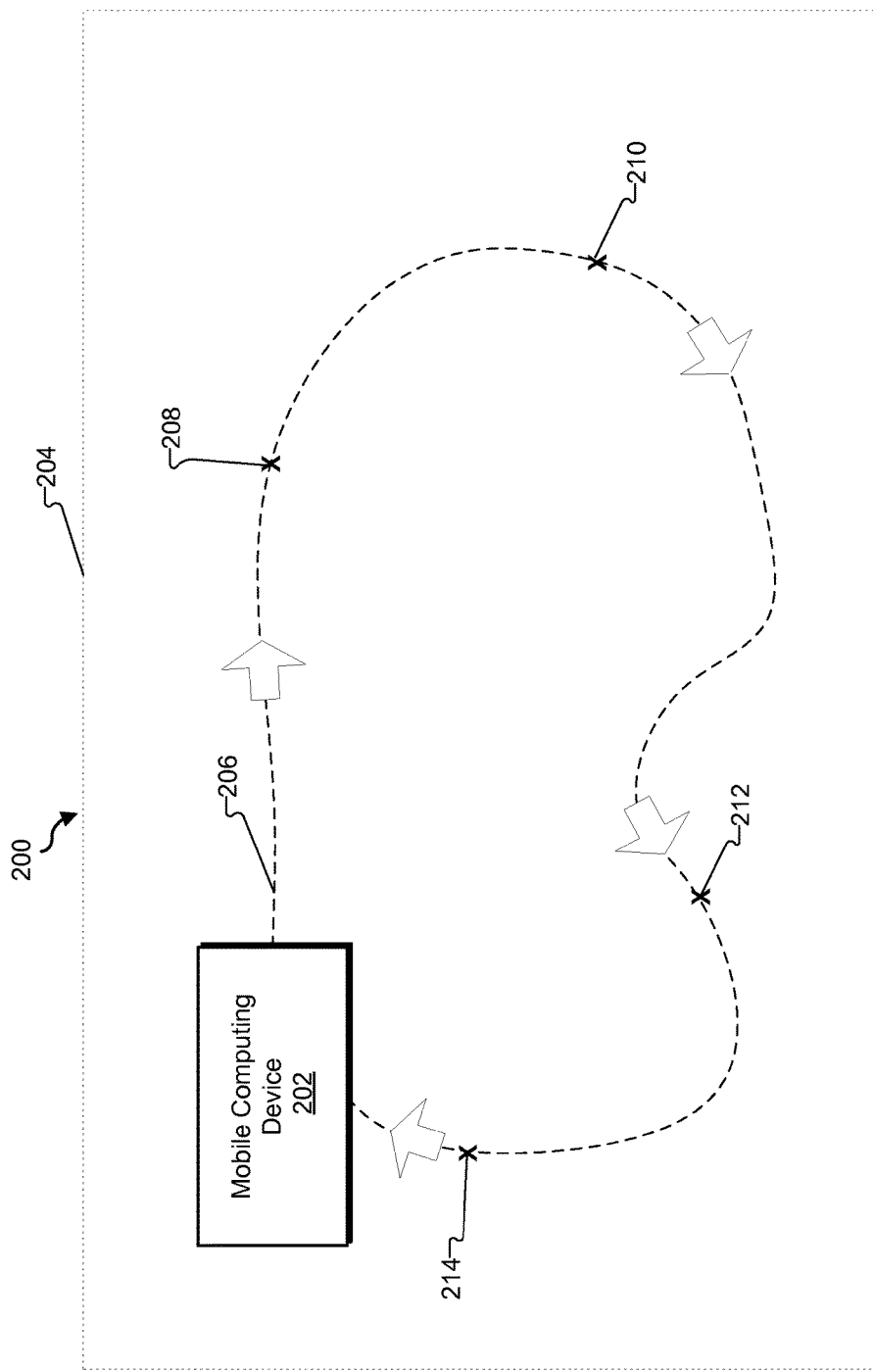
FIG. 2 illustrates an exemplary implementation according to principles described herein.

To illustrate, FIG. 2 depicts an exemplary implementation 200 showing a mobile computing device 202 that moves within a geographic zone 204 while mobile computing device 202 receives streaming content. Geographic zone 204 may include any suitable geographic area. For example, geographic zone 204 may include a geographic area that corresponds to a network footprint of a mobile network. Mobile computing device 202 may move within geographic zone 204 in any suitable manner (e.g., as a user carries mobile computing device 202 while the user travels within geographic zone 204) and along any suitable route. In the example shown in FIG. 2, mobile computing device 202 moves along an exemplary route 206 within geographic zone 204. While mobile computing device 202 moves along route 206, dead zone management facility 102 may monitor one or more network connectivity factors as mobile computing device 202 receives the streaming content to determine network connectivity levels at particular geographic locations.

Based on the monitored one or more network connectivity factors, dead zone management facility 102 may detect that a network connectivity level is above a predetermined threshold until mobile computing device 202 reaches location 208. Dead zone management facility 102 may continue to monitor the one or more network connectivity factors as the mobile computing device 202 travels along route 206 and detect that the network connectivity level stays below the predetermined threshold until mobile computing device 202 reaches location 210. Dead zone management facility 102 may continue to monitor the one or more network connectivity factors as mobile computing device 202 travels along route 206 and detect that the network connectivity level stays above the predetermined threshold until mobile computing device 202 reaches location 212. Afterwards, dead zone management facility 102 may detect that the network connectivity level stays below the predetermined threshold until mobile computing device 202 reaches location 214. Dead zone management facility 102 may then store the information associated with when and where the network connectivity level falls below the predetermined threshold as dead zone data 112.

Although FIG. 2 illustrates a single mobile computing device 202, it is understood that dead zone management facility 102 may also track (either concurrently or at different times) one or more additional mobile computing devices within geographic zone 204 in order to identify one or more dead zones. Dead zone management facility 102 may store information associated with the tracked one or more additional mobile computing devices as dead zone data 112 to be used for any suitable purpose, such as described herein. For example, dead zone data 112 associated with movements of mobile computing device 202 may be applied in any suitable manner to facilitate presentation of streaming content by the one or more additional mobile computing devices. Likewise, dead zone data 112 associated with movements of the one or more additional mobile computing devices may be applied in any suitable manner to facilitate presentation of streaming content by mobile computing device 202.

In certain examples, dead zone management facility 102 may perform one or more operations associated with generating, maintaining, and/or updating one or more network connectivity maps based on one or more network connectivity factors associated with one or more mobile computing devices. As used herein, a "network connectivity map" may refer to any suitable data structure and/or graphical representation that identifies one or more dead zones in a geographic zone based on network connectivity levels associated with the one or more dead zones. Dead zone management facility 102 may generate, maintain, and/or update a network connectivity map in any suitable manner.

For example, based on dead zone data 112 from the example illustrated in FIG. 2, dead zone management facility 102 may designate geographic areas associated with locations 208 and 210 and locations 212 and 214 as dead zones where the network connectivity levels are below the predetermined threshold. Dead zone management facility 102 may then generate a network connectivity map that identifies geographic areas associated with locations 208 and 210 and locations 212 and 214 as having network connectivity levels that are below the predetermined threshold.

Figure 3:
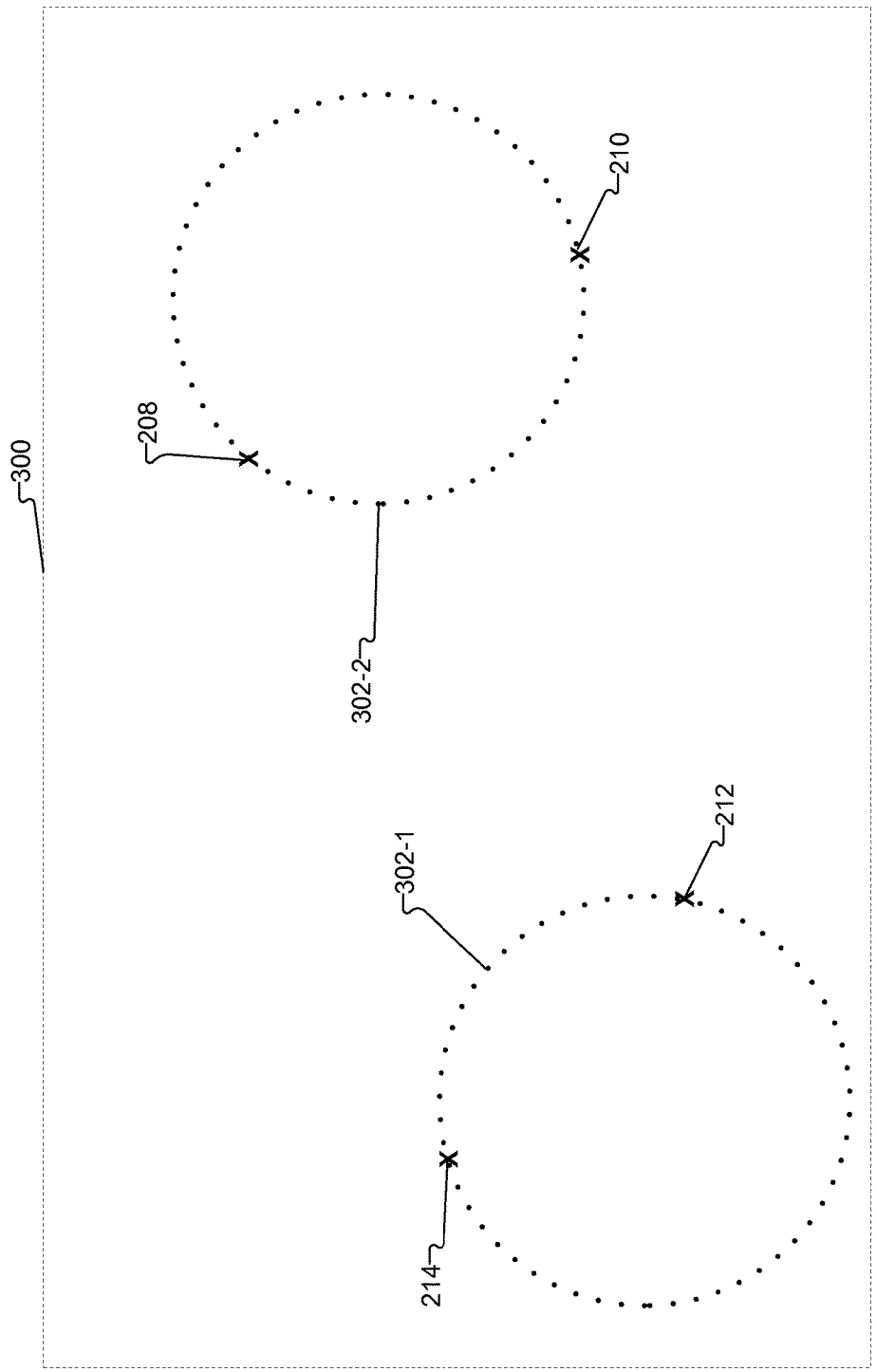
FIG. 3 illustrates an exemplary network connectivity map according to principles described herein.

A network connectivity map may have any suitable form and may be represented in any suitable manner. To illustrate, FIG. 3 shows an exemplary network connectivity map 300 that is generated based on the movements of mobile computing device 202 in FIG. 2. As shown in FIG. 3, network connectivity map 300 includes geographic areas 302 (e.g., geographic areas 302-1 and 302-2) that are designated as areas in which the network connectivity level is below the predefined threshold. Geographic areas 302-1 and 302-2 may be referred to herein as dead zones based on there being either limited or no network connectivity within them.

The exemplary network connectivity map 300 illustrated in FIG. 3 is provided for illustrative purposes only. Other network connectivity maps may be provided and/or utilized in other implementations. For example, although FIG. 3 illustrates geographic areas 302-1 and 302-2 as being circular, dead zones included in a network connectivity map may have any suitable size and/or shape as may suit a particular implementation. In addition, a smaller or larger number of dead zones may be illustrated in a given network connectivity map in certain implementations. In addition, while FIG. 3 illustrates a two-dimensional network connectivity map 300, it will be understood that the network connectivity map 300 may be three dimensional in certain implementations.

In certain examples, the dead zones included in a network connectivity map may at least partially overlap one another. For example, a network connectivity map may include a first dead zone in which there is limited network connectivity (i.e., there is some network connectivity but the network connectivity level is below the predetermined threshold) that at least partially overlaps with a second dead zone in which there is no network connectivity.

In certain examples, a size and/or shape of a dead zone may change after dead zone management facility 102 generates a network connectivity map. Various factors may contribute to a change in a size and/or shape of a dead zone identified in a network connectivity map. For example, a wireless network service provider may upgrade a network infrastructure (e.g., by adding a cell tower), which may result in improved network connectivity levels near a dead zone. Additionally or alternatively, a change in load (e.g., an amount of usage) of the network may contribute to a change in a size and/or shape of a dead zone. For example, a network connectivity map may include a relatively large dead zone in a specific geographic area (e.g., a high traffic area) during a morning commute but may include a relatively small dead zone in the specific geographic area at other times of the day/night. Other factors may influence a size and/or shape of a dead zone identified within a network connectivity map in other implementations.

To facilitate determining whether there has been a change in a size and/or shape of a dead zone, dead zone management facility 102 may be configured detect a change in a network connectivity level associated with a dead zone identified in the network connectivity map. Dead zone management facility 102 may detect the change in any suitable manner. For example, dead zone management facility 102 may access updated dead zone data 112 and access information indicative of the change. The information indicative of the change may originate from detected information associated with mobile computing device 202 and/or one or more additional mobile computing devices. In certain examples, the change in the network connectivity level may indicate that an area of the dead zone is smaller than previously designated, larger than previously designated, or of a different shape than previously designated. Alternatively, the change in the network connectivity level may indicate that a geographic area previously designated as a dead zone is no longer a dead zone.

After dead zone management facility 102 determines that there has been a change in a size and/or shape of a dead zone, dead zone management facility 102 may update the geographic area associated with the dead zone identified in the network connectivity map. Dead zone management facility 102 may update a geographic area associated with the dead zone in any suitable manner. For example, dead zone management facility 102 may adjust a size and/or shape of a dead zone indicated in the network connectivity map based on the information indicative of the change. Alternatively, dead zone management facility 102 may remove the dead zone from the network connectivity map if the information indicative of the change indicates that the dead zone is no longer a dead zone.

Figure 4:
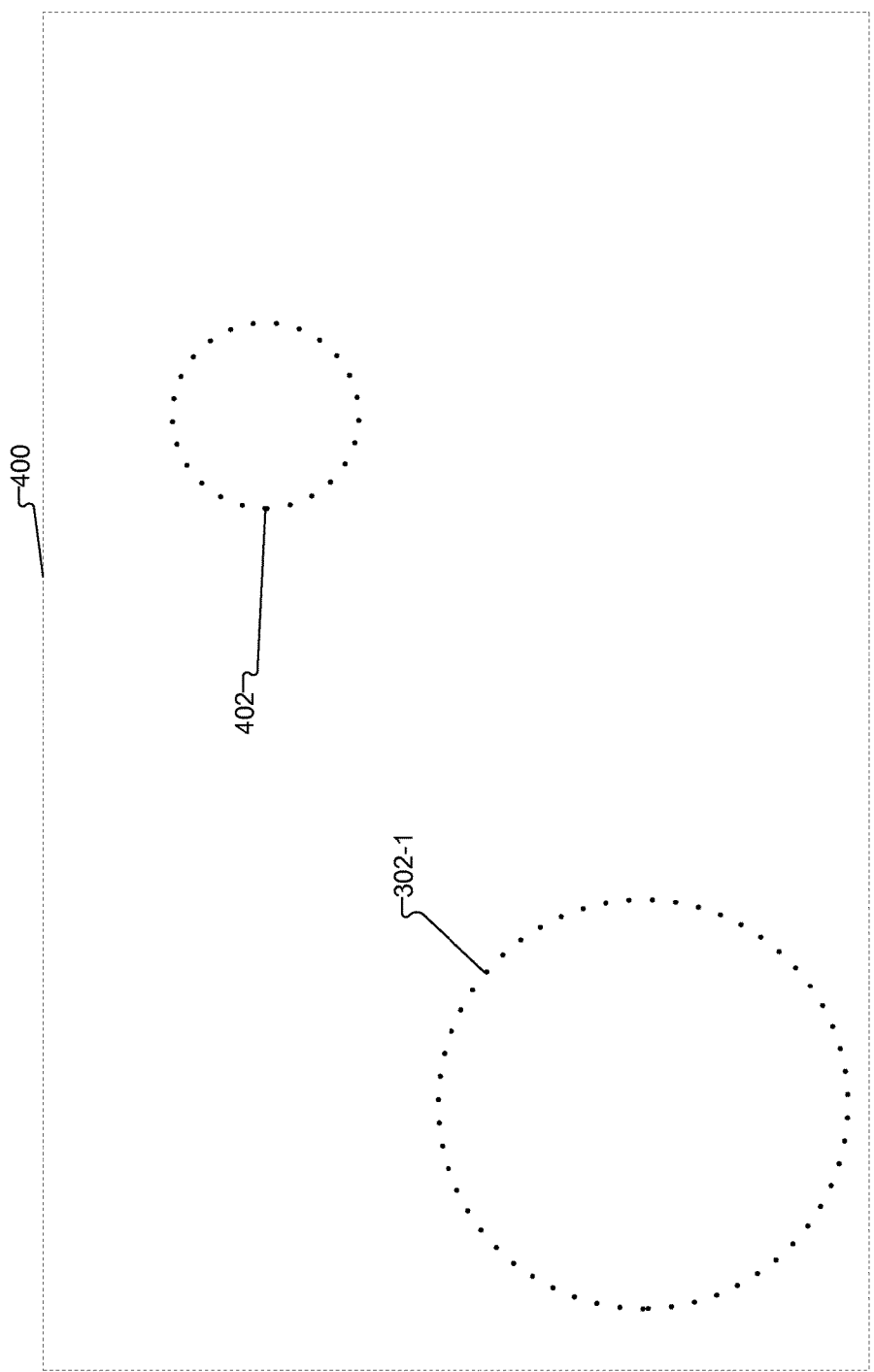
FIG. 4 illustrates an exemplary updated network connectivity map according to principles described herein.

FIG. 4 shows an exemplary updated network connectivity map 400 that represents an updated version of network connectivity map 300 illustrated in FIG. 3. To update network connectivity map 300, dead zone management facility 102 may access updated dead zone data 112 that indicates, for example, that a network connectivity level at locations 208 and/or 210 is now above the predetermined threshold. The updated dead zone data 112 may also indicate that the network connectivity level does not fall below the predetermined threshold until, for example, mobile computing device 202 reaches a location on the perimeter of geographic area 402 illustrated in FIG. 4. Based on the updated dead zone data 112, dead zone management facility 102 may update network connectivity map 300 to designate geographic area 402 as a dead zone instead of geographic area 302-2. As shown, geographic area 402 is relatively smaller than geographic area 302-2 illustrated in FIG. 3.

In certain examples, different makes and/or models of mobile computing devices may have hardware/software configurations that result in varying network connectivity levels in a given geographic area. Accordingly, in certain examples, dead zone management facility 102 may generate a network connectivity map that is specific to a particular make and/or model of a mobile computing device. For example, a first mobile computing device may, based on a make and/or model of the first mobile computing device, have a hardware/software configuration that allows the first mobile computing device to have a network connectivity level that is above the predetermined threshold, for example, within geographic area 402. However, a second mobile computing device may, based on a make and/or model of the second mobile computing device, have a hardware/software configuration that results in a network connectivity level below the predetermined threshold within geographic area 402. Accordingly, in certain implementations, dead zone management facility 102 may generate a first network connectivity map that is specific to the first mobile computing device and a second network connectivity map that is specific to the second mobile computing device.

In certain examples, different service providers (e.g., mobile phone service providers) may provide networks with different network connectivity levels at a particular geographic location. Accordingly, in certain examples, dead zone management facility 102 may generate a network connectivity map that is specific to a particular service provider. For example, a first service provider may have or otherwise be associated with a robust network in which there are relatively few dead zones in a particular geographic zone. On the other hand, a second service provider may have or otherwise be associated with a network in which there are a plurality of dead zones in the particular geographic zone. Accordingly, in certain examples, dead zone management facility 102 may generate network connectivity maps that are specific to each of the first service provider and the second service provider.

In certain examples, one or more geographic areas associated with one or more dead zones indicated in a network connectivity map may change depending on what time of day/night a mobile computing device receives the streaming content. For example, during the evening there may be an increased load on the network in a residential area as a result of users streaming more content than at other times. As a result of the increased load, there may be a relatively large dead zone associated with the residential area during the evening. However, the same residential area may have a network connectivity level above the predetermined threshold at other times of a day/night. Accordingly, dead zone management facility 102 may generate different network connectivity maps for a single geographic zone that vary depending on a time of the day/night.

Although the preceding disclosure describes dead zone management facility 102 as generating, maintaining, and/or updating the network connectivity map, in certain examples, the network connectivity map may be generated, maintained, and/or updated by a third party not associated with system 100. In such an example, system 100 may utilize a network connectivity map provided by the third party to facilitate dynamically adjusting a size of a buffer based on a geographic location of a mobile computing device.

Returning to FIG. 1, after dead zone management facility 102 either generates or otherwise accesses the network connectivity map, tracking facility 104 may track a geographic location of a mobile computing device (e.g., mobile computing device 202 and/or an additional mobile computing device) while the mobile computing device receives streaming content by way of the network. Tracking facility 104 may be configured to track the geographic location in any suitable manner. For example, tracking facility 104 may detect an exact location (e.g., latitude and longitude coordinates) of the mobile computing device. Alternatively, tracking facility 104 may be configured to detect an approximate location (e.g., by way of triangulation) of the mobile computing device. Tracking facility 104 may also be configured to track a speed and direction of travel of the mobile computing device. Tracking facility 104 may store information associated with the tracked geographic location and or speed of the mobile computing device as tracking data 110.

The tracking of the geographic location and/or speed of the mobile computing device may be performed in any suitable way and using any suitable technologies, including, without limitation, Global Positioning System ("GPS") technologies and terrestrial signaling triangulation technologies. For example, tracking facility 104 may track the geographic location and/or speed of the mobile computing device by continuously or periodically monitoring the geographic location and/or speed of the mobile computing device as the mobile computing device moves within a geographic zone.

In certain examples, tracking facility 104 may be configured to track (e.g., learn), over time, travel patterns of a user of a mobile computing device to generate a travel history of the user. For example, tracking facility 104 may learn routes routinely taken by the user of the mobile computing device (e.g., the user may take the same route each morning to work) and may store information associated with the routes as tracking data 110. The travel history may be used in any suitable manner, such as described herein. For example, the travel history may be used, in certain examples and as described in more detail below, to predict when and/or how long a mobile computing device may be within a dead zone to facilitate managing a buffer size to ensure continuous presentation of streaming content while the mobile computing device is within the dead zone.

Buffer management facility 106 may be configured to perform one or more buffer management operations. For example, buffer management facility 106 may determine, based on the tracked geographic location of the mobile computing device, that the mobile computing device is approaching a dead zone (i.e., a geographic area identified as having a network connectivity level that is below a predetermined threshold). In response, and based on the tracked geographic location, buffer management facility 106 may dynamically increase a size of a buffer maintained by the mobile computing device and used to present the streaming content by way of the mobile computing device.

Figure 5:
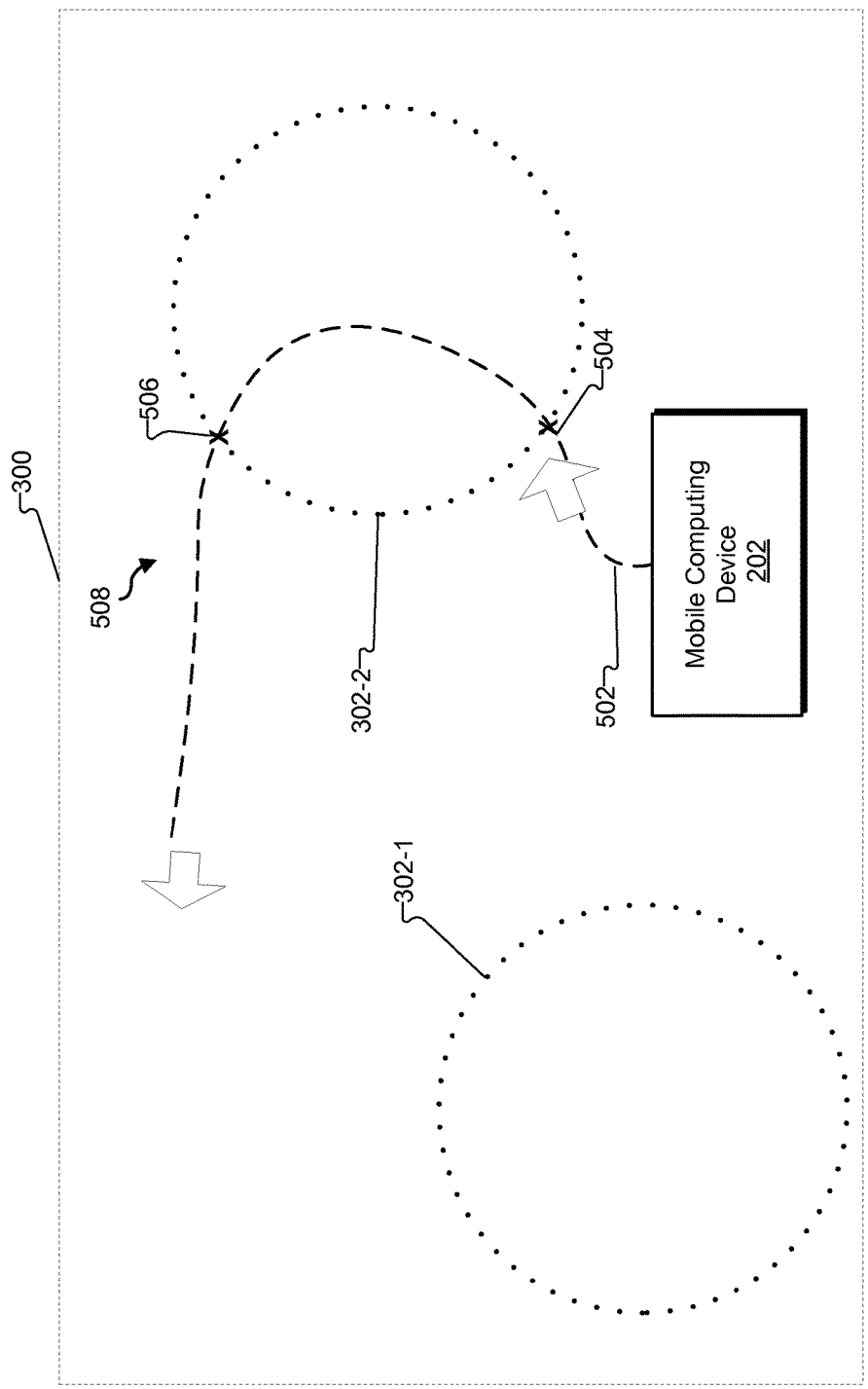
FIG. 5 illustrates an exemplary implementation showing movement of a mobile computing device with respect to a network connectivity map according to principles described herein.

To illustrate an example, FIG. 5 shows an exemplary utilization of network connectivity map 300 of FIG. 3 to facilitate receipt and/or presentation of streaming content by mobile computing device 202. As shown in FIG. 5, mobile computing device 202 is traveling along a route 502 and is approaching geographic area 302-2, which, as described above, has been designated as having a network connectivity level that is below the predetermined threshold. In the example shown in FIG. 5, a size of a buffer used by mobile computing device 202 may be insufficient to continuously present the streaming content while mobile computing device 202 is within geographic area 302-2. To facilitate continuous presentation of the streaming content, buffer management facility 106 may determine, in any suitable manner, that mobile computing device 202 will enter geographic area 302-2 at location 504 and exit geographic area 302-2 at location 506. Based on route 502, buffer management facility 106 may direct mobile computing device 202 to dynamically increase a size of the buffer maintained by mobile computing device 202 such that the buffer is sufficiently large to ensure an uninterrupted presentation of the streaming content while mobile computing device 202 travels through geographic area 302-2. Buffer management facility 106 may direct mobile computing device 202 to dynamically increase the size of the buffer to any suitable size as may suit a particular implementation. In certain examples, the dynamic increase in the size of the buffer may only be limited by available hard drive space and/or certain Operation System ("OS") ceilings of mobile computing device 202.

Buffer management facility 106 may direct mobile computing device 202 to dynamically increase the size of the buffer at any suitable time. In certain examples, buffer management facility 106 may direct mobile computing device 202 to dynamically increase the size of the buffer prior to mobile computing device 202 entering the dead zone. For example, buffer management facility 106 may determine an amount of time for the mobile computing device 202 to reach the dead zone based on a tracked speed of mobile computing device 202. Buffer management facility 106 may then determine a start time at which to dynamically increase the size of the buffer based on the determined amount of time. Alternatively (e.g., in situations where the dead zone has at least some network connectivity), buffer management facility 106 may direct mobile computing device 202 to dynamically increase the size of the buffer after entering the dead zone.

In certain examples, mobile computing device 202 may receive streaming content for a plurality of streaming applications that are concurrently being executed by mobile computing device 202. Each streaming application may use a separate buffer to receive streaming content. For example, a first streaming application may utilize a first buffer to receive streaming content and a second streaming application may utilize a second buffer to receive additional streaming content. The first buffer may be specific in size to the streaming content received through the first streaming application and the second buffer may be specific in size to the additional streaming content received through the second streaming application. Accordingly, in certain examples, buffer management facility 106 may direct mobile computing device to dynamically increase a size of a buffer for each of the streaming applications that are concurrently being executed by mobile computing device 202.

After buffer management facility 106 dynamically increases the size of the buffer, buffer management facility 106 may direct mobile computing device 202 to fill the buffer with the streaming content such that mobile computing device 202 may travel through geographic area 302-2 without interruption of a presentation of the streaming content by way of mobile computing device 202. Mobile computing device 202 may fill the buffer in any suitable manner and at any suitable time. In certain examples, the filling of the buffer may occur prior to mobile computing device 202 entering the dead zone (e.g., in situations where there is no network connectivity in the dead zone). Alternatively, the filling of the buffer may occur before and/or while mobile computing device 202 is within the dead zone. For example, in the example shown in FIG. 5, buffer management facility 106 may direct mobile computing device 202 to dynamically increase the size of the buffer and fill the buffer prior to entering geographic area 302-2 based on there being no network connectivity within geographic area 302-2.

In certain examples, buffer management facility 106 may leverage one or more additional networks (e.g., a Wi-Fi network) to fill the buffer. Buffer management facility 106 may leverage the one or more additional networks before and/or after mobile computing device 202 enters a dead zone. For example, buffer management facility 106 may utilize a Wi-Fi network at a home of a user of mobile computing device 202 to fill a buffer prior to the user transporting mobile computing device 202 into a dead zone. Additionally or alternatively, buffer management facility 106 may discover and utilize a Wi-Fi network outside and/or within a dead zone to facilitate mobile computing device 202 filling the buffer.

After buffer management facility 106 dynamically increases the size of the buffer and based on a tracked geographic location of mobile computing device 202, buffer management facility 106 may determine that mobile computing device 202 exits geographic area 302-2. For example, the tracked geographic location may indicate that mobile computing device 202 passes location 506 in FIG. 5 and enters an area 508 of network connectivity map 300 that has a network connectivity level that is above the predetermined threshold. While in area 508, the dynamically increased size of the buffer may be larger than is needed to continuously present the streaming content by way of mobile computing device 202. Accordingly, buffer management facility 106 may, based on the tracked geographic location of mobile computing device 202 and based on mobile computing device 202 entering area 508, dynamically decrease the size of the buffer.

Figure 6:
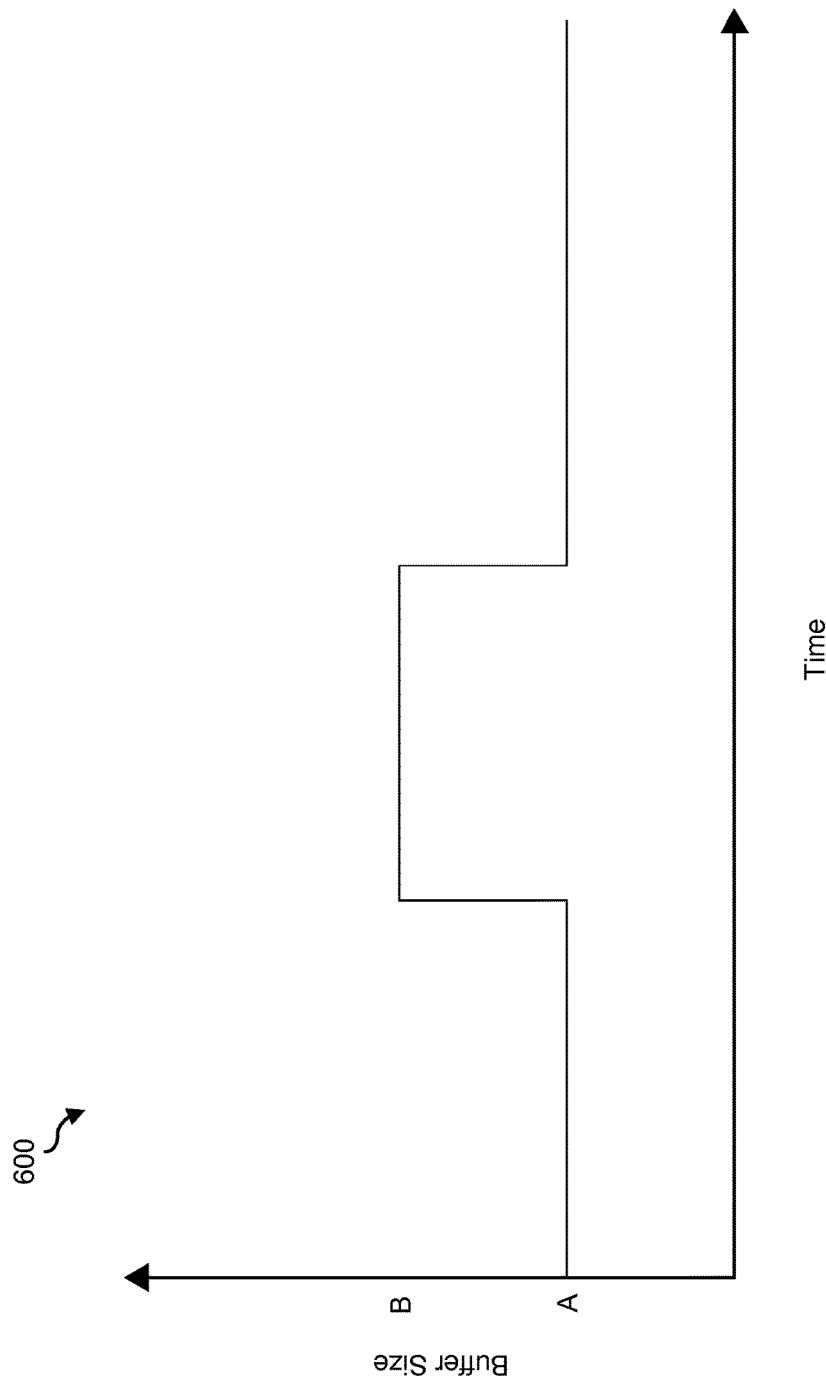
FIG. 6 illustrates a graph showing a dynamic change in buffer size as a function of time according to principles described herein.

Buffer management facility 106 may dynamically adjust (i.e., increase or decrease) the size of a buffer in any suitable manner. In certain examples, buffer management facility 106 may dynamically adjust the size of the buffer for an estimated amount of time that a mobile computing device will be within a dead zone. To illustrate, FIG. 6 shows an exemplary graph 600 that shows a size of a buffer as a function of time. As shown in FIG. 6, the buffer is initially at a first size A. Based on a mobile computing device approaching or entering a dead zone, buffer management facility 106 may dynamically increase the size of the buffer from the first size A to a second size B for an estimated amount of time that the mobile computing device will be within the dead zone. After the estimated amount of time, and after mobile computing device 202 exits the dead zone, buffer management facility 106 may dynamically decrease the size of the buffer from the second size B back to the first size A.

The exemplary graph 600 shown in FIG. 6 is provided for illustrative purposes only. It is understood that in certain implementations buffer management facility 106 may dynamically increase or dynamically decrease the buffer size to one or more intermediate levels based on the network connectivity map before returning to first buffer size A. For example, buffer management facility 106 may dynamically increase the size of the buffer from the second size B to another size that is greater than second size B prior to dynamically decreasing the size of the buffer back to first size A. Alternatively, buffer management facility 106 may, after dynamically increasing the size of the buffer to the second size B, dynamically decrease the size of the buffer to an additional size that is either greater or less than first size A.

In certain examples, buffer management facility 106 may dynamically increase the size of a buffer based on a tracked speed at which a mobile computing device approaches a dead zone. For example, mobile computing device 202 in FIG. 5 will arrive at location 504 more quickly when traveling at 75 miles per hour than when traveling at 35 miles per hour. Accordingly, buffer management facility 106 may direct mobile computing device 202 to dynamically increase the size of the buffer and fill the buffer more quickly when mobile computing device 202 is approaching the dead zone at a faster speed as opposed to a slower speed. Additionally or alternatively, buffer management facility 106 may determine, based on the tracked speed, a particular time at which the size of the buffer is to be increased or decreased. In addition, because mobile computing device 202 may be within the dead zone for a relatively shorter amount of time when traveling 75 miles per hour than when traveling 35 miles per hour, the dynamic increase in the size of the buffer may be less when mobile computing device 202 is approaching the dead zone at a faster speed as opposed to a slower speed.

In certain examples, after buffer management facility 106 directs mobile computing device 202 to dynamically increase the size of the buffer, tracking data 110 may indicate that there has been a change in the speed at which the mobile computing device approaches a dead zone. For example, tracking data 110 may initially indicate that mobile computing device 202 has a first tracked speed. Buffer management facility 106 may direct mobile computing device 202 to increase the size of the buffer based on the first tracked speed. However, after the size of the buffer is dynamically increased, mobile computing device 202 may change speeds and start approaching the dead zone at a second tracked speed. Based on the second tracked speed, buffer management facility 106 may dynamically adjust the size of the buffer. For example, if the second tracked speed is less than the first track speed (e.g., due to the user being stuck in traffic), a larger buffer may be needed because mobile computing device 202 may be within the dead zone for a longer amount of time than previously estimated. Accordingly, in such an example, buffer management facility 106 may direct mobile computing device 202 to dynamically increase the size of the buffer again to compensate for the increased amount of time that mobile computing device 202 may be within the dead zone. Alternatively, if the second tracked speed is more than the first tracked speed, the dynamically increased size of the buffer may be more than is needed. Accordingly, in such an example, buffer management facility 106 may direct mobile computing device 202 to dynamically decrease the size of the buffer based on the decreased amount of time that the mobile computing device may be within the dead zone. Buffer management facility 106 may direct mobile computing device to dynamically increase or dynamically decrease a size of a buffer as often and as many times as needed to facilitate preventing interruption of a presentation of streaming content while mobile computing device 202 is within a dead zone.

Additionally or alternatively, buffer management facility 106 may dynamically increase or decrease a size of a buffer based on a determined time that mobile computing device 202 will be within a dead zone. For example, buffer management facility 106 may access tracking data 110 and estimate, based on a current speed, a direction of travel, and/or a travel history of a user of mobile computing device 202, that mobile computing device 202 will be within the dead zone for a determined average time. Buffer management facility 106 may then dynamically increase the size of the buffer such that the buffer is large enough to facilitate continuous presentation of streaming content within the dead zone for the determined average time.

In certain examples, after mobile computing device 202 exits a dead zone, buffer management facility 106 may direct mobile computing device 202 to stop receiving streaming content by way of the network and only stream off of the buffer. This may be accomplished in any suitable manner. For example, buffer management facility 106 may direct mobile computing device 202 to only stream off of the buffer until a predetermined amount of streaming content remains in the buffer. After the predetermined amount of streaming content remains in the buffer, buffer management facility 106 may direct mobile computing device 202 to dynamically decrease the size of the buffer and begin receiving streaming content again by way of the network. In so doing, it may be possible for buffer management facility 106 to ensure that no more data is consumed by way of the network than is needed at a particular time, which may facilitate efficient consumption of network resources.

Figure 7:
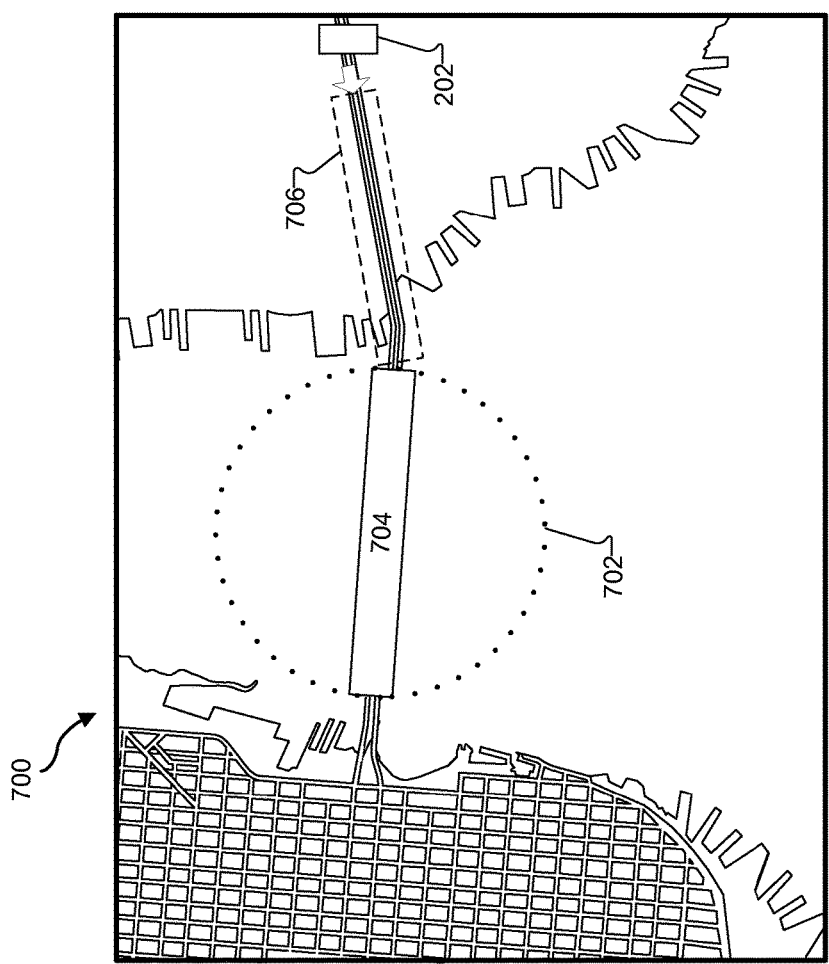
FIG. 7 illustrates an additional exemplary network connectivity map according to principles described herein.

To illustrate an example of the foregoing embodiments, FIG. 7 shows an exemplary network connectivity map 700 that depicts mobile computing device 202 traveling down a road (e.g., in a vehicle) and approaching a geographic area 702 that has been designated as a dead zone. In the example shown in FIG. 7, geographic area 702 is associated with a tunnel 704 in which there is either limited or no network connectivity. Buffer management facility 106 may access tracking data 110 and dead zone data 112 and determine, based on a tracked speed and direction of travel of mobile computing device 202, that mobile computing device 202 is approaching and will arrive at geographic area 702 (i.e., tunnel 704) at an estimated time. For example, based on the tracked speed and direction of travel of mobile computing device 202, buffer management facility 106 may determine that mobile computing device 202 will enter geographic area 702 in two minutes and will be within geographic area 702 for three minutes. Buffer management facility 106 may then direct mobile computing device 202 to dynamically increase a size of a buffer used to receive the streaming content such that there is no interruption in the presentation of the streaming content by mobile computing device 202 while in geographic area 702.

In the example shown in FIG. 7, buffer management facility 106 may direct mobile computing device 202 to dynamically increase the size of the buffer and start filling the buffer prior to mobile computing device 202 entering geographic area 702 (i.e., within two minutes as mobile computing device approaches geographic area 702). For example, buffer management facility 106 may direct mobile computing device 202 to increase the size of the buffer and fill the buffer while mobile computing device 202 is within a zone 706 to facilitate continuous presentation of the streaming content while mobile computing device 202 passes through geographic area 702.

Figure 8:
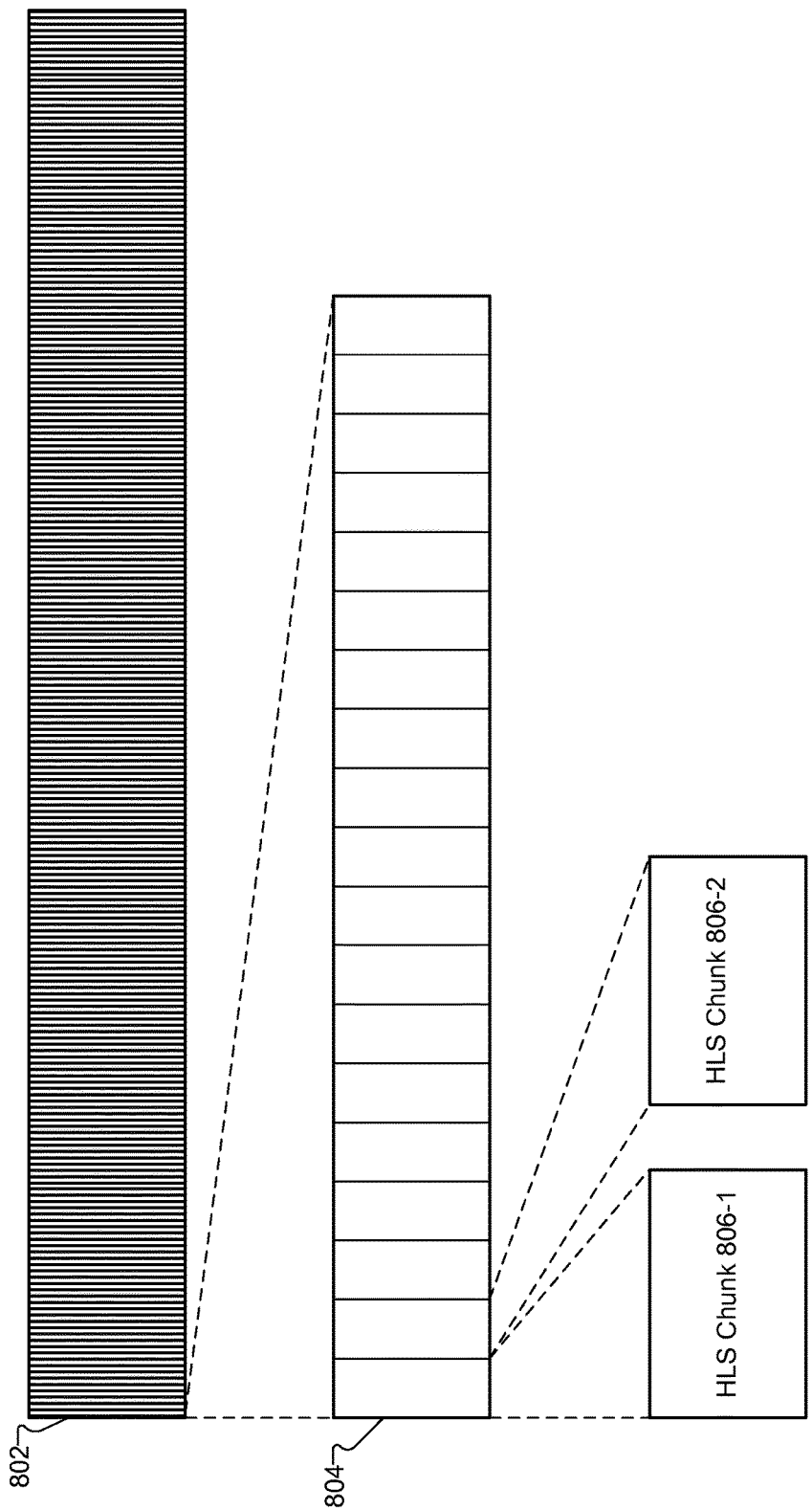
FIG. 8 illustrates an exemplary depiction of streaming content according to principles described herein.

Mobile computing device 202 may receive the streaming content in any suitable manner and from any suitable source. In certain examples, streaming content may be divided into a plurality of segments that are then streamed to mobile computing device 202. FIG. 8 illustrates an exemplary implementation 800 in which streaming content 802 is segmented into a plurality of Hypertext Transfer Protocol ("HTTP") live streaming chunks ("HLS chunks"). Referring to the example shown in FIG. 7, while mobile computing device approaches geographic area 702, mobile computing device 202 may be streaming, for example, an hour long television show that includes one gigabyte of data. As mentioned above, the tracked speed and direction of travel of mobile computing device 202 may indicate that mobile computing device 202 will be within geographic area 702 for three minutes. Accordingly, to make it through geographic area 702 without an interruption in the presentation of the streaming content, mobile computing device 202 may need to buffer at least 180 seconds of the television show. In FIG. 8, the vertical lines in streaming content 802 are representative of a number of HLS chunks that may be included in the one gigabyte of data required to stream the television show. Assuming each HLS chunk is ten seconds long or 48.55 KBs per HLS chunk, mobile computing device 202 may then dynamically increase the size of the buffer so as to buffer, for example, nineteen HLS chunks at ten seconds each for a total of 922.36 KBs as mobile computing device 202 approaches geographic area 702. In FIG. 8, a fly-out section 804 represents the nineteen HLS chunks, and HLS chunks 806-1 and 806-2 represent two of the nineteen HLS chunks utilized to fill the buffer.

Figure 9:
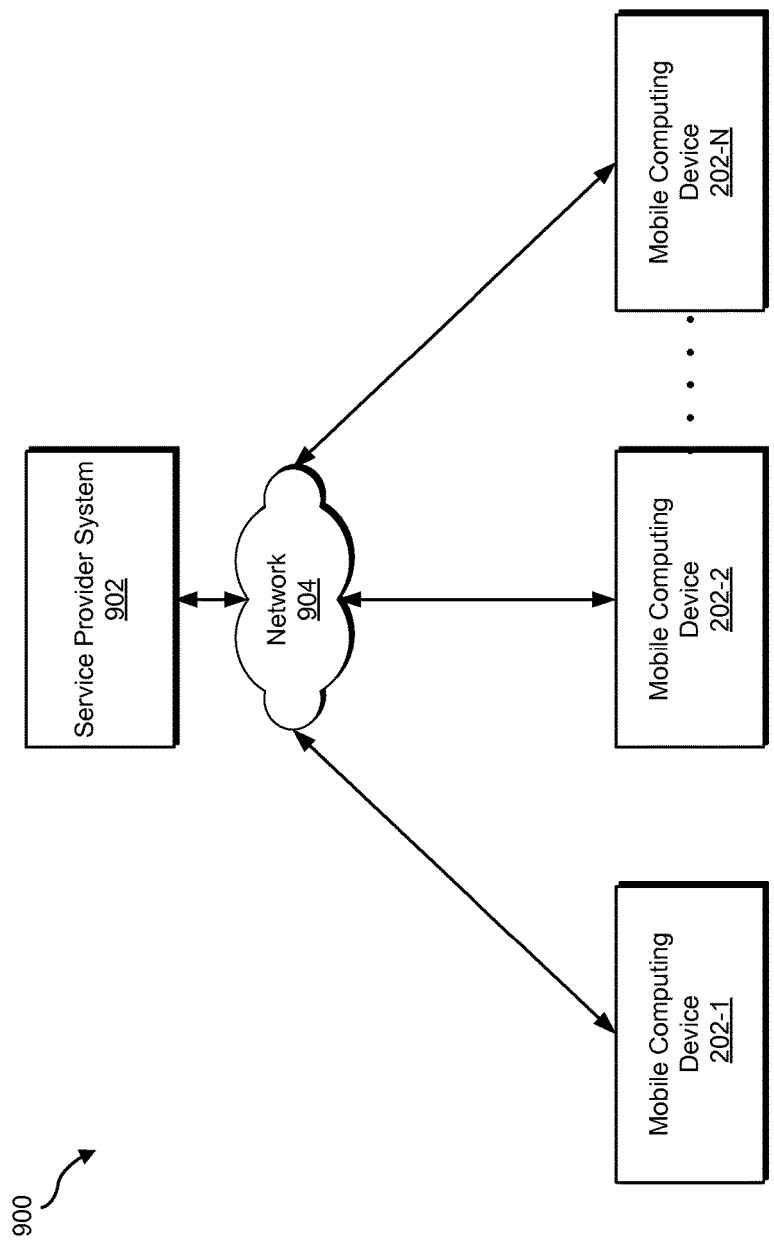
FIG. 9 illustrates an exemplary implementation of the system of FIG. 1 according to principles described herein.

FIG. 9 illustrates an exemplary implementation 900 of system 100 wherein a service provider system 902 is communicatively coupled to mobile computing devices 202 (e.g., mobile computing devices 202-1 through 202-N) by way of network 904. Dead zone management facility 102, tracking facility 104, buffer management facility 106, and storage facility 108 may each be implemented by service provider system 902 and/or one or more of mobile computing devices 202. Accordingly, in certain embodiments, components of system 100 may be implemented entirely by service provider system 902 or by one or more of mobile computing devices 202. In other embodiments, components of system 100 may be distributed across service provider system 902 and mobile computing devices 202.

Service provider system 902 may be associated with a service provider (e.g., a subscriber television service provider, an Internet service provider, a mobile phone service provider, etc.), a media content program provider (e.g., ESPN, NBC, etc.), and/or any other type of streaming content provider. Accordingly, service provider system 902 may be configured to provide one or more media content services (e.g., television services, video-on-demand services, Internet services, application services, etc.) to mobile computing devices 202. For example, service provider system 902 may be configured to manage (e.g., maintain, process, distribute, and/or generate) media content (e.g., media content programs, advertisements, etc.) configured to be delivered to mobile computing devices 202. Service provider system 902 may be implemented by one or more computing devices as may serve a particular implementation.

Additionally or alternatively, service provider system 902 may be implemented by one or more third party servers configured to manage recommended streaming content, interface with one or more social media service provider subsystems, and/or perform any other operation associated with the methods and systems described herein.

The streaming content received by mobile computing devices 202 by way of network 904 may be provided by service provider system 902 or some other source. Mobile computing devices 202 may facilitate access by a user to streaming content (e.g., media content) provided by service provider system 902 and/or some other source. For example, mobile computing devices 202 may be configured to perform one or more access events at the direction of a user. To illustrate, mobile computing devices 202 may present streaming content at the direction of a user.

Mobile computing devices 202 may include one or more user computing devices associated with a user. Examples of such devices include, without limitation, any of the mobile computing devices described herein.

Service provider system 902 and mobile computing devices 202 may communicate using any communication platforms and technologies suitable for transporting data (e.g., media programs data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), HTTP, Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), RF signaling technologies, wireless communication technologies, Internet communication technologies, media streaming technologies, media download technologies, and other suitable communications technologies.

In certain embodiments, service provider system 902 and mobile computing devices 202 may communicate via network 904. Network 904 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between service provider system 902 and mobile computing devices 202. Communications between service provider system 902 and mobile computing devices 202 may be transported using any one of the above-listed networks, or any combination or sub-combination of the above-listed networks. Alternatively, service provider system 902 and mobile computing devices 202 may communicate in another way such as by direct connections between service provider system 902 and mobile computing devices 202.

Figure 10:
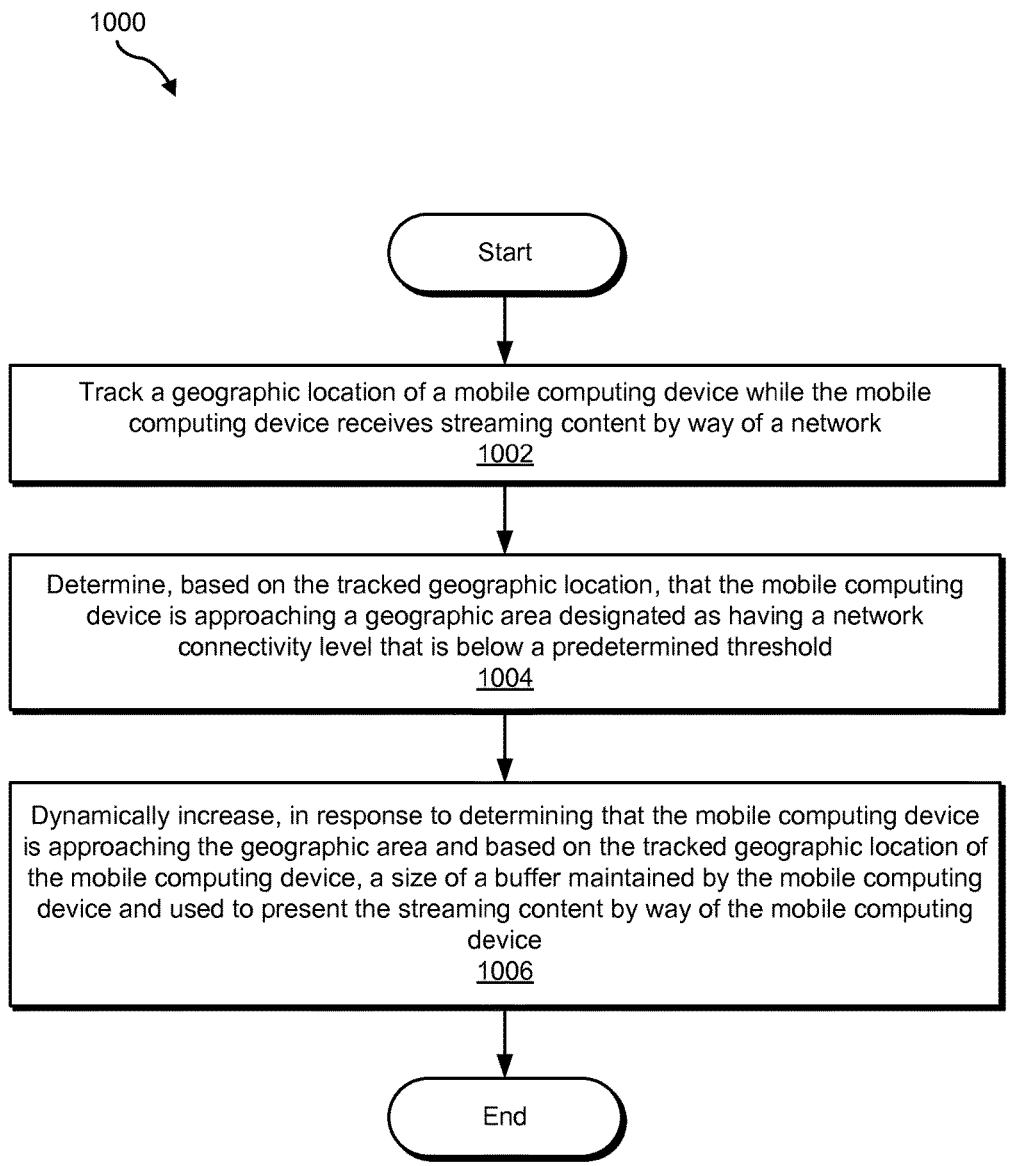
FIGS. 10-11 illustrate exemplary location-based buffer management methods according to principles described herein.
Figure 11:
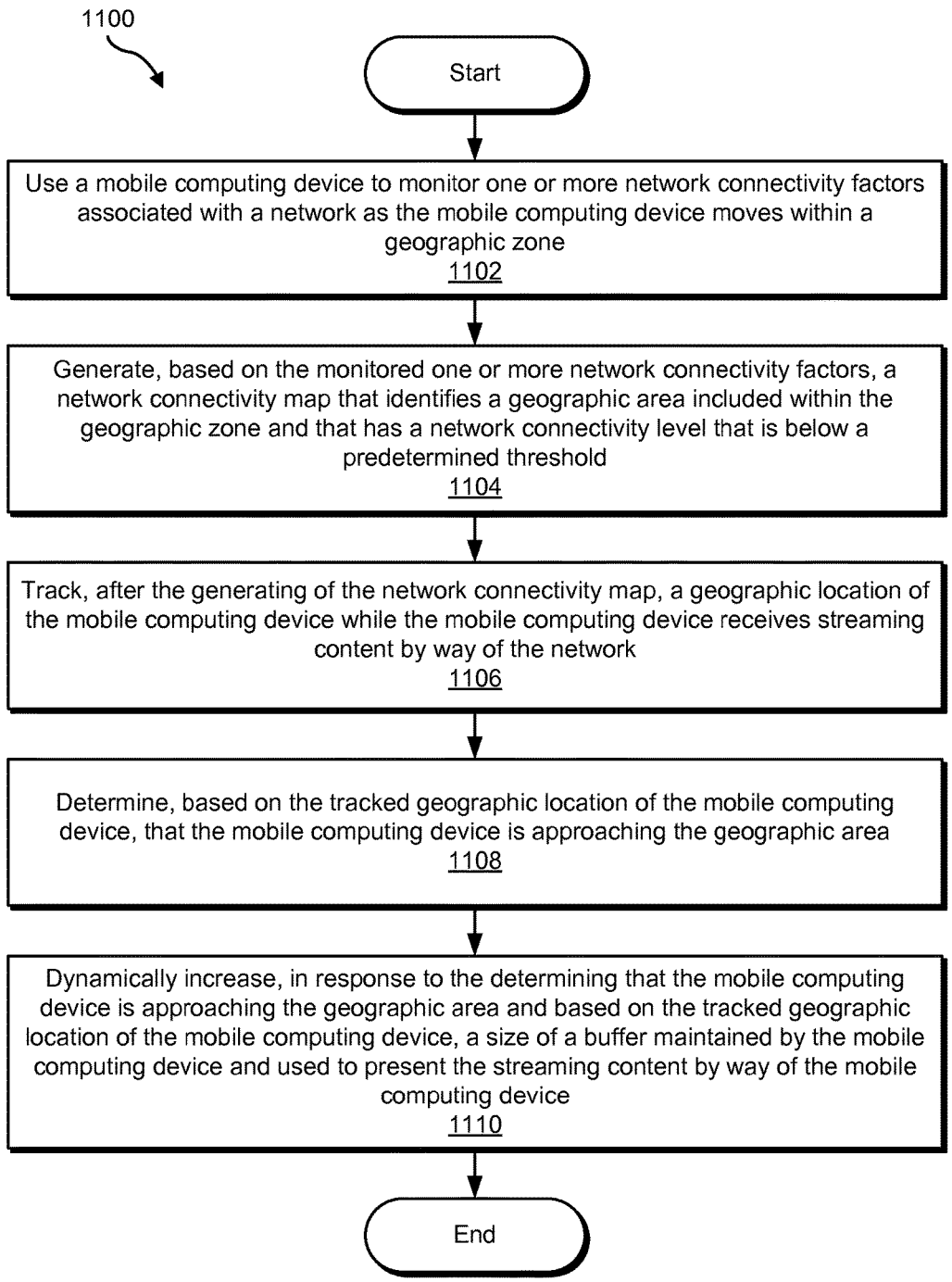

FIGS. 10-11 illustrate exemplary location-based buffer management methods 1000 and 1100 according to principles described herein. While FIGS. 10-11 illustrate exemplary steps according to certain embodiments, other embodiments may omit, add to, reorder, combine, and/or modify any of the steps shown in FIGS. 10-11. In certain embodiments, one or more of the steps shown in FIGS. 10-11 may be performed by system 100 and/or one or more components or implementations of system 100.

Turning to FIG. 10, in step 1002, a system (e.g., system 100) tracks a geographic location of a mobile computing device while the mobile computing device receives streaming content by way of a network. Step 1002 may be performed in any of the ways described herein.

In step 1004, the system determines, based on the tracked geographic location, that the mobile computing device is approaching a geographic area designated as having a network connectivity level that is below a predetermined threshold. Step 1004 may be performed in any of the ways described herein.

In step 1006, the system dynamically increases, in response to determining that the mobile computing device is approaching the geographic area and based on the tracked geographic location of the mobile computing device, a size of a buffer maintained by the mobile computing device and used to present the streaming content by way of the mobile computing device. Step 1006 may be performed in any of the ways described herein.

Turing to FIG. 11, in step 1102, a system (e.g., system 100) uses a mobile computing device to monitor one or more network connectivity factors associated with a network as the mobile computing device moves within a geographic zone. Step 1102 may be performed in any of the ways described herein.

In step 1104, the system generates, based on the monitored one or more network connectivity factors, a network connectivity map that identifies a geographic area included within the geographic zone and that has a network connectivity level that is below a predetermined threshold. Step 1104 may be performed in any of the ways described herein.

In step 1106, the system tracks, after the generating of the network connectivity map, a geographic location of the mobile computing device while the mobile computing device receives streaming content by way of the network. Step 1106 may be performed in any of the ways described herein.

In step 1108, the system determines, based on the tracked geographic location of the mobile computing device, that the mobile computing device is approaching the geographic area. Step 1108 may be performed in any of the ways described herein.

In step 1110, the system dynamically increases, in response to the determining that the mobile computing device is approaching the geographic area and based on the tracked geographic location of the mobile computing device, a size of a buffer maintained by the mobile computing device and used to present the streaming content by way of the mobile computing device. Step 1110 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 12:
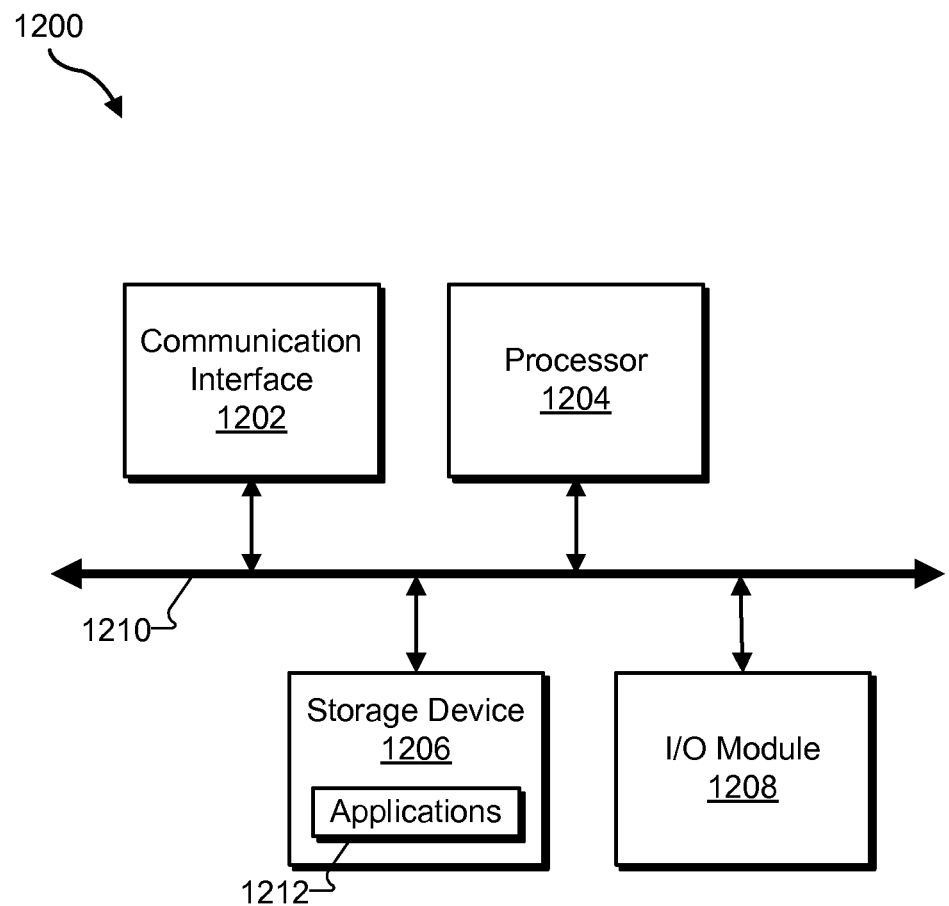
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output (I/O) module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. For example, in addition or alternative to being communicatively connected by way of communication infrastructure 1210, one or more components of computing device 1200 may be communicatively connected by way of one or more other suitable interfaces. For instance, communication interface 1202, storage device 1206, I/O module 1208, and/or any other components of computing device 1200 may be communicatively coupled directly to processor 1204 via one or more interfaces (e.g., discrete interfaces). Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, and any other suitable interface. In at least one embodiment, communication interface 1202 may provide a direct connection between system 100 and one or more of provisioning systems via a direct link to a network, such as the Internet. Communication interface 1202 may additionally or alternatively provide such a connection through, for example, a local area network (such as an Ethernet network), a personal area network, a telephone or cable network, a satellite data connection, a dedicated URL, or any other suitable connection. Communication interface 1202 may be configured to interface with any suitable communication media, protocols, and formats, including any of those mentioned above.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1200. For example, one or more applications 1212 residing within storage device 1206 may be configured to direct processor 1204 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
   tracking, by a buffer management system, a geographic location of a mobile computing device while the mobile computing device receives streaming content by way of a network;
   accessing, by the buffer management system based on the tracked geographic location, a three dimensional network connectivity map that identifies a geographic area that has a network connectivity level that is below a predetermined threshold, the three dimensional network connectivity map including
      a first network connectivity map in which the geographic area has a first size at a first time of the day, and
      a second network connectivity map in which the geographic area has a second size that is different from the first size at a second time of the day;
   determining, by the buffer management system based on the tracked geographic location, that the mobile computing device is approaching the geographic area at the first time of day;

using, by the buffer management system based on the mobile computing device approaching the geographic area at the first time of day, the first network connectivity map instead of the second network connectivity map to determine when and where to change a size of a buffer included in and maintained by the mobile computing device and used to present the streaming content by way of the mobile computing device;

directing, by the buffer management system in response to determining that the mobile computing device is approaching the geographic area at the first time of the day and based on the tracked geographic location of the mobile computing device and the first network connectivity map, the mobile computing device to dynamically increase the size of the buffer;

directing, by the buffer management system after the mobile computing device dynamically increases the size of the buffer, the mobile computing device to fill the buffer with the streaming content such that the mobile computing device travels through the geographic area without interruption of a presentation of the streaming content by way of the mobile computing device, the directing of the mobile computing device to fill the buffer with streaming content including directing the mobile computing device to discover, while the mobile computing device travels through the geographic area designated as having the network connectivity level that is below the predetermined threshold, a wireless local area network accessible in the geographic area, and directing the mobile computing device to utilize the wireless local area network to fill the buffer while the mobile computing device travels through the geographic area;

determining, by the buffer management system based on the tracked geographic location and after the dynamically increasing of the size of the buffer, that the mobile computing device exits the geographic area and enters an additional geographic area having an additional network connectivity level that is above the predetermined threshold;

directing, by the buffer management system after the mobile computing device enters the additional geographic area, the mobile computing device to stop receiving the streaming content by way of the network and only present the streaming content currently buffered in the buffer until a predetermined amount of the streaming content remains in the buffer; and directing, by the buffer management system based on the tracked geographic location of the mobile computing device and after the mobile computing device enters the additional geographic area and after the predetermined amount of streaming content remains in the buffer, the mobile computing device to dynamically decrease the size of the buffer, wherein the first network connectivity map and the second network connectivity map include information that indicates how many times re-buffering occurs in various geographic areas and which is used in the dynamically increasing of the size of the buffer and the dynamically decreasing of the size of the buffer.

2. The method of claim 1, wherein:
the mobile computing device receives the streaming content for one or more streaming applications that are actively operating by way of the mobile computing device when the mobile computing device is approaching the geographic area; and the directing of the mobile computing device to dynamically increase the size of the buffer includes directing the mobile computing device to dynamically increase a size of a buffer of each of the one or more streaming applications.

3. The method of claim 1, further comprising:
tracking, by the buffer management system, a speed at which the mobile computing device approaches the geographic area;
wherein the directing of the mobile computing device to dynamically increase the size of the buffer is further based on the tracked speed.

4. The method of claim 3, further comprising:
detecting, by the buffer management system, a change in the speed at which the mobile computing device approaches the geographic area;
directing, by the buffer management system and after the mobile computing device dynamically increases the size of the buffer, the mobile computing device to dynamically adjust the size of the buffer based on the change in the speed at which the mobile computing device approaches the geographic area.

5. The method of claim 1, further comprising:
estimating, by the buffer management system, an amount of time that the mobile computing device will be within the geographic area;
wherein the directing of the mobile computing device to dynamically increase the size of the buffer is further based on the estimated amount of time.

6. The method of claim 1, further comprising:
tracking, by the buffer management system, a speed at which the mobile computing device approaches the geographic area;
determining, by the buffer management system based on the tracked speed, an amount of time for the mobile computing device to reach the geographic area; and
determining, by the buffer management system based on the determined amount of time, a start time at which the buffer is to be dynamically increased.

7. A method comprising:
using, by a buffer management system, a mobile computing device to monitor one or more network connectivity factors associated with a network as the mobile computing device moves within a geographic zone;
generating, by the buffer management system based on the monitored one or more network connectivity factors, a three dimensional network connectivity map that identifies a geographic area included within the geographic zone and that has a network connectivity level that is below a predetermined threshold, the three dimensional network connectivity map including
a first network connectivity map in which the geographic area has a first size at a first time of day, and
a second network connectivity map in which the geographic area has a second size that is different from the first size at a second time of the day;
tracking, by the buffer management system after the generating of the three dimensional network connectivity map, a geographic location of the mobile computing device while the mobile computing device receives streaming content by way of the network;
determining, by the buffer management system based on the tracked geographic location of the mobile computing device, that the mobile computing device is approaching the geographic area at the first time of the day;

using, by the buffer management system based on the mobile computing device approaching the geographic area at the first time of day, the first network connectivity map instead of the second network connectivity map to determine when and where to change a size of a buffer included in and maintained by the mobile computing device and used to present the streaming content by way of the mobile computing device;

directing, by the buffer management system in response to the determining that the mobile computing device is approaching the geographic area at the first time of the day and based on the tracked geographic location of the mobile computing device and the first network connectivity map, the mobile computing device to dynamically increase the size of the buffer;

directing, by the buffer management system after the mobile computing device dynamically increases the size of the buffer, the mobile computing device to fill the buffer with the streaming content such that the mobile computing device travels through the geographic area without interruption of a presentation of the streaming content by way of the mobile computing device, the directing of the mobile computing device to fill the buffer with streaming content including
 directing the mobile computing device to discover, while the mobile computing device travels through the geographic area designated as having the network connectivity level that is below the predetermined threshold, a wireless local area network accessible in the geographic area, and
 directing the mobile computing device to utilize the wireless local area network to fill the buffer while the mobile computing device travels through the geographic area;

determining, by the buffer management system based on the tracked geographic location and after the dynamically increasing of the size of the buffer, that the mobile computing device exits the geographic area and enters an additional geographic area having an additional network connectivity level that is above the predetermined threshold;

directing, by the buffer management system after the mobile computing device enters the additional geographic area, the mobile computing device to stop receiving the streaming content by way of the network and only present the streaming content currently buffered in the buffer until a predetermined amount of the streaming content remains in the buffer; and directing, by the buffer management system based on the tracked geographic location of the mobile computing device and after the mobile computing device enters the additional geographic area and after the predetermined amount of streaming content remains in the buffer, the mobile computing device to dynamically decrease the size of the buffer, wherein the first network connectivity map and the second network connectivity map include information that indicates how many times re-buffering occurs in various geographic areas and which is used in the dynamically increasing of the size of the buffer and the dynamically decreasing of the size of the buffer.

8. The method of claim 7, further comprising:
tracking, by the buffer management system after the generating of the three dimensional network connectivity map, a geographic location of an additional mobile computing device while the additional mobile computing device receives additional streaming content by way of the network;

determining, by the buffer management system based on the tracked geographic location of the additional mobile computing device, that the additional mobile computing device is approaching the geographic area identified in the three dimensional network connectivity map; and directing, by the buffer management system in response to the determining that the additional mobile computing device is approaching the geographic area and based on the tracked geographic location of the additional mobile computing device, the additional mobile computing device to dynamically increase a size of a buffer included in and maintained by the additional mobile computing device and used to present the additional streaming content by way of the additional mobile computing device.

9. The method of claim 7, further comprising:
detecting, by the buffer management system after the generating of the three dimensional network connectivity map, a change in a network connectivity level associated with the geographic area identified in the three dimensional network connectivity map at the first time of the day; and updating, by the buffer management system in response to the detecting of the change, the geographic area identified in the three dimensional network connectivity map;

wherein the updating of the geographic area includes one of increasing the first size of the geographic area, decreasing the first size of the geographic area, and removing the geographic area from the first network connectivity map.

10. The method of claim 7, wherein the three dimensional network connectivity map is specific to a make of the mobile computing device.

11. The method of claim 7, wherein the mobile computing device is a mobile phone device and the three dimensional network connectivity map is specific to a mobile phone service provider associated with the mobile phone device.

12. A system comprising:
at least one physical computing device that
 tracks a geographic location of a mobile computing device while the mobile computing device receives streaming content by way of a network;
 accesses, based on the tracked geographic location, a three dimensional network connectivity map that identifies a geographic area that has a network connectivity level that is below a predetermined threshold, the three dimensional network connectivity map including
  a first network connectivity map in which the geographic area has a first size at a first time of the day, and
  a second network connectivity map in which the geographic area has a second size that is different from the first size at a second time of the day;
 determines, based on the tracked geographic location, that the mobile computing device is approaching the geographic area at the first time of day;
 uses, based on the mobile computing device approaching the geographic area at the first time of day, the first network connectivity map instead of the second network connectivity map to determine when and where to change a size of a buffer included in and maintained by the mobile computing device and used to present the streaming content by way of the mobile computing device;

directs, in response to the determining that the mobile computing device is approaching the geographic area at the first time of the day and based on the tracked geographic location of the mobile computing device and the first network connectivity map, the mobile computing device to dynamically increase the size of the buffer;

directs, after the mobile computing device dynamically increases the size of the buffer, the mobile computing device to fill the buffer with the streaming content such that the mobile computing device travels through the geographic area without interruption of a presentation of the streaming content by way of the mobile computing device, the at least one physical computing device directing the mobile computing device to fill the buffer with streaming content by directing the mobile computing device to discover, while the mobile computing device travels through the geographic area designated as having the network connectivity level that is below the predetermined threshold, a wireless local area network accessible in the geographic area, and directing the mobile computing device to utilize the wireless local area network to fill the buffer while the mobile computing device travels through the geographic area;

determines, based on the tracked geographic location and after the dynamically increasing of the size of the buffer, that the mobile computing device exits the geographic area and enters an additional geographic area having an additional network connectivity level that is above the predetermined threshold;

directs, after the mobile computing device enters the additional geographic area, the mobile computing device to stop receiving the streaming content by way of the network and only present the streaming content currently buffered in the buffer until a predetermined amount of the streaming content remains in the buffer, and directs, based on the tracked geographic location of the mobile computing device and after the mobile computing device enters the additional geographic area and after the predetermined amount of streaming content remains in the buffer, the mobile computing device to dynamically decrease the size of the buffer, wherein the at least one physical computing device is implemented by at least one of the mobile computing device and a device other than the mobile computing device, and the first network connectivity map and the second network connectivity map include information that indicates how many times re-buffering occurs in various geographic areas and which is used in the dynamically increasing of the size of the buffer and the dynamically decreasing of the size of the buffer.

13. The system of claim 12, wherein the at least one physical computing device directs the mobile computing device to dynamically increase the size of the buffer prior to the mobile computing device entering the geographic area.

14. The system of claim 12, wherein the at least one physical computing device designates the geographic area as having the network connectivity level that is below the predetermined threshold based on detecting a plurality of network connectivity factors associated with at least one of the mobile computing device and one or more additional mobile computing devices.

15. The method of claim 7, wherein the three dimensional network connectivity map is specific to a model of the mobile computing device.

16. The method of claim 1, wherein the buffer management system is implemented by an application stored in a storage device of the mobile computing device.

* * * * *